Feb. 16, 1932.　　　P. E. GOOD　　　1,844,954
METHOD AND APPARATUS FOR CONTROLLING BLOWERS
Filed Nov. 28, 1930　　　4 Sheets-Sheet 4

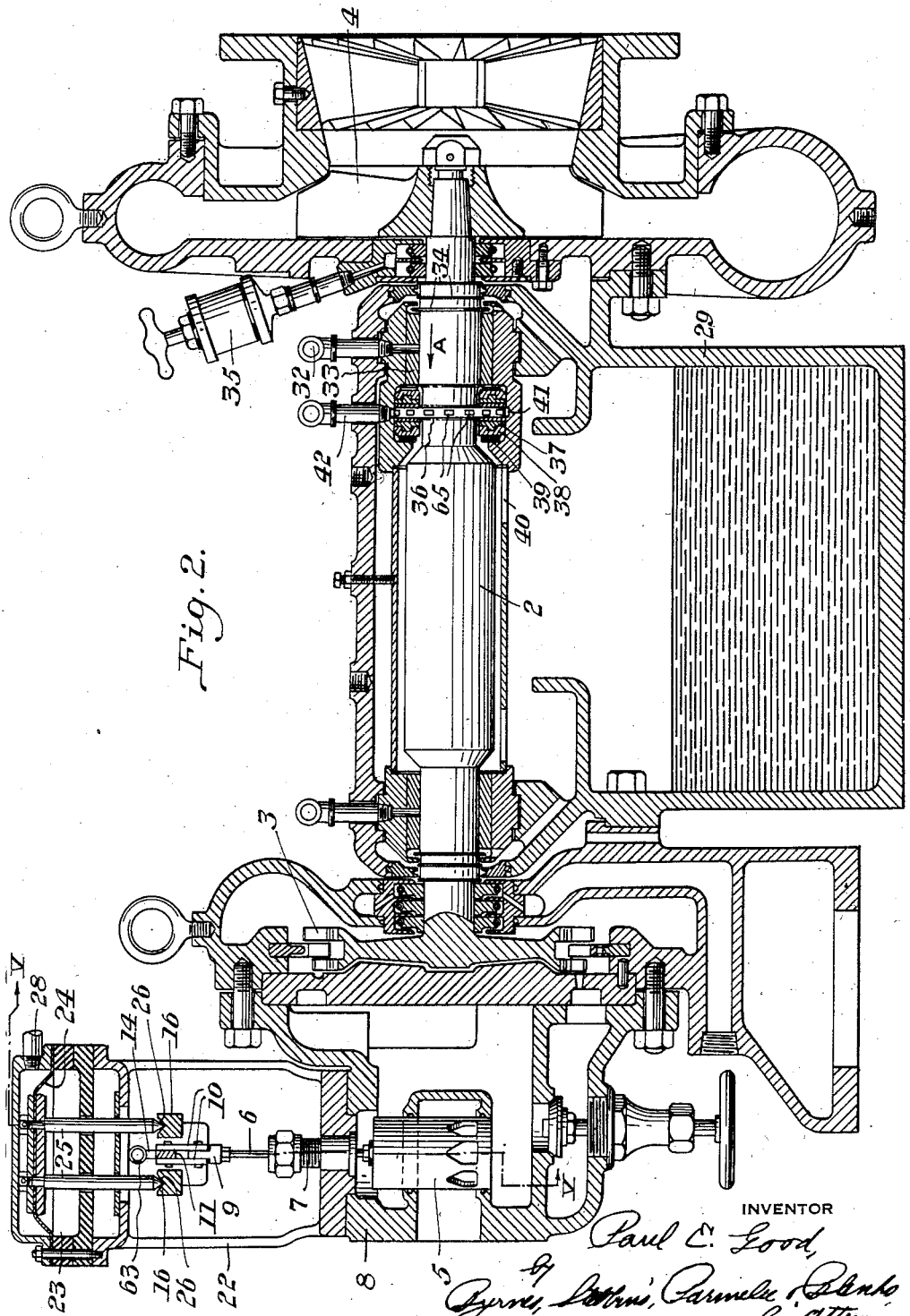

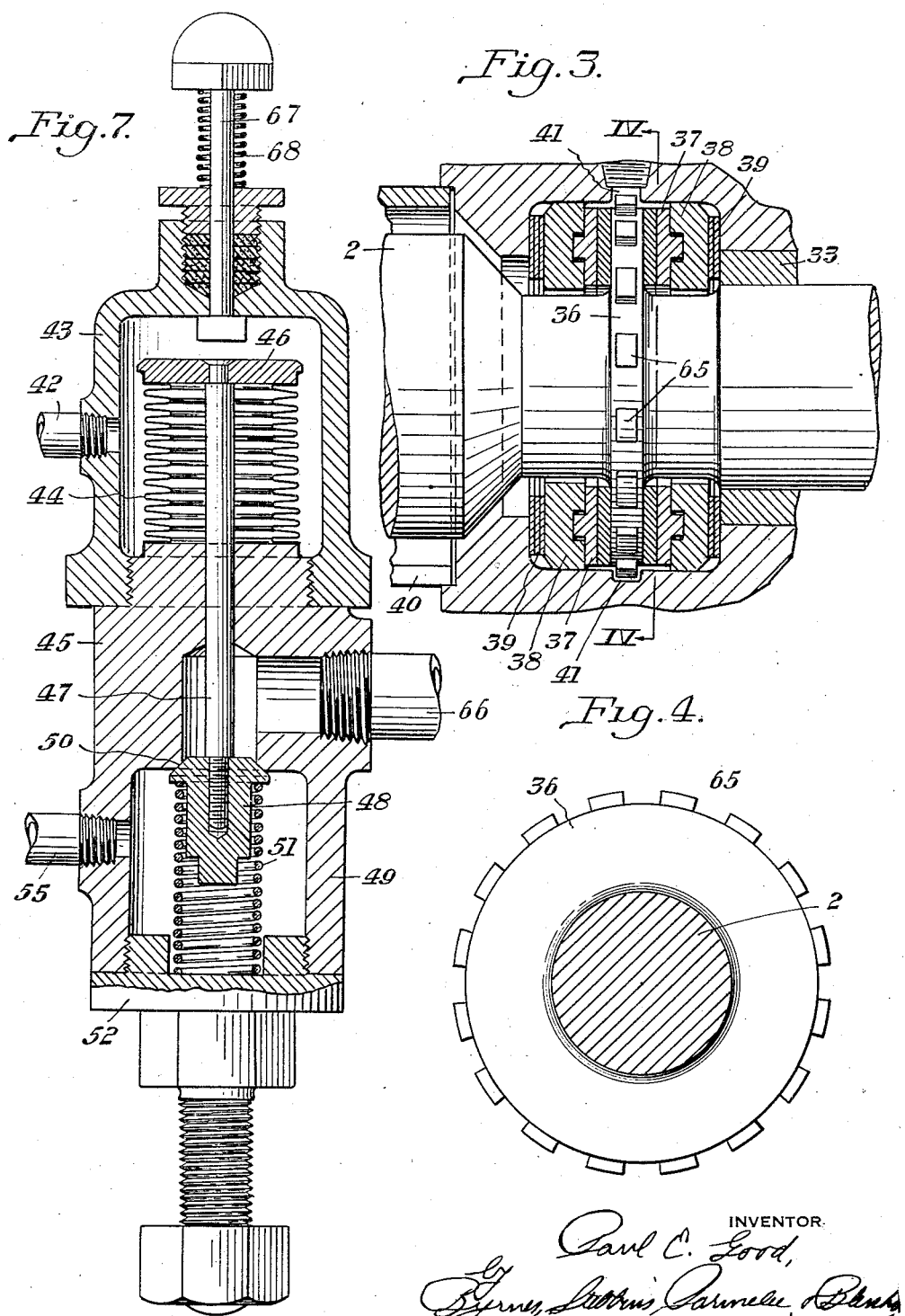

INVENTOR
Paul C. Good

Patented Feb. 16, 1932

1,844,954

UNITED STATES PATENT OFFICE

PAUL E. GOOD, OF RIVERTON, NEW JERSEY, ASSIGNOR TO ELLIOTT COMPANY, OF PITTSBURGH, PENNSYLVANIA, A CORPORATION OF PENNSYLVANIA

METHOD AND APPARATUS FOR CONTROLLING BLOWERS

Application filed November 28, 1930. Serial No. 498,771.

The present invention relates broadly to the art of controlling governing devices operable in response to speed conditions, and more particularly to a device of this general character adaptable for use with blowers and similar equipment for controlling the overspeed thereof.

It is quite customary in the art to which the present invention relates to provide blowers driven by turbines and to provide suitable control systems by means of which the speed of the turbines is regulated to maintain predetermined conditions of operation of the blower. Such control systems in addition to constituting speed controlling or regulating means, also not infrequently include an over-speed cutout for automatically cutting off the supply of steam to the turbine when the blower exceeds a predetermined speed. So far as I am aware, such control systems as heretofore provided have required special pressure producing units with means for correlating such units to the apparatus which is in turn being regulated.

It is one of the objects of the present invention to provide an improved regulating system, the regulating function of which shall be limited to an over-speed control as distinguished from a speed control effective for regulating the normal operating speed.

Another of the objects of the present invention is to provide an improved structure in which certain of the parts which are necessarily provided are adapted to perform a dual function such that the number of auxiliary units required for effecting the desired over-speed control is reduced to a minimum.

In the accompanying drawings I have shown for purposes of illustration only, a preferred embodiment of the present invention. In the drawings:

Figure 2 is a longitudinal sectional view through a turbo-blower installation embodying the invention, and illustrated diagrammatically in Figure 1;

Figure 3 is a detail view, on an enlarged scale, of a portion of the blower shaft and thrust collar;

Figure 4 is a transverse sectional view on the line IV—IV of Figure 3, looking in the direction of the arrows;

Figure 7 is a detail sectional view through the relay control cylinder.

Figure 1:
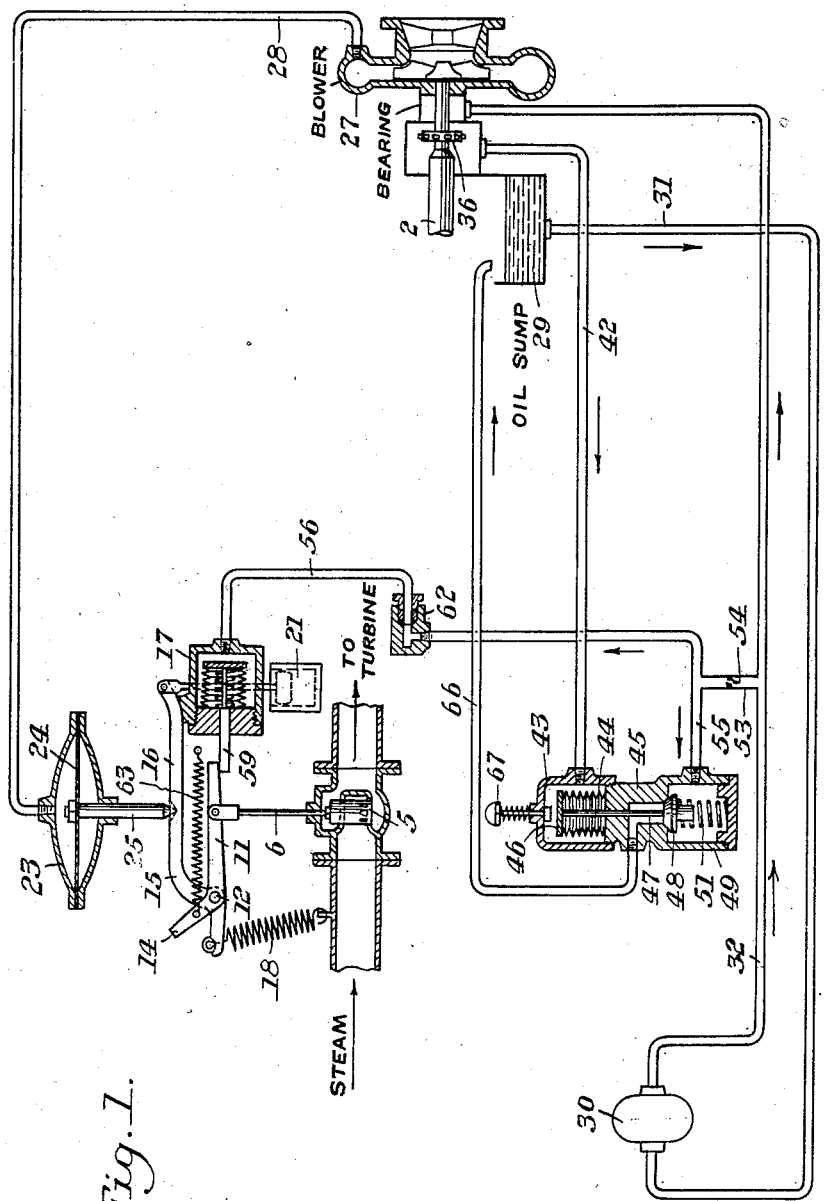
Figure 1 is a diagrammatic view illustrating a system constructed and operating in accordance with the present invention.

Referring more particularly to Figure 2 of the drawings, there is illustrated a turbo-blower installation comprising a shaft 2, having secured to one end thereof a turbine rotor 3 effective for driving the blower impeller 4, carried by the opposite end of the shaft. Both the turbine and the blower may be of any usual or preferred construction and constitute no essential part of the present invention insofar as their particular construction is concerned. For purposes of simplicity, therefore, they will herein only be generally referred to.

For controlling the supply of operating steam for the turbine 3, there is illustrated a steam valve 5 having an operating stem 6 extending through a suitable stuffing box 7 in the valve housing 8. The stem 6 at its upper end is shown as carrying a head 9, with opposite sides of which cooperate links 10, which links, in turn, at their upper ends are pivotally connected to the substantially horizontally extending arms 11 of a lever, having a pivotal mounting 12 and an upstanding portion 14.

Figure 5:
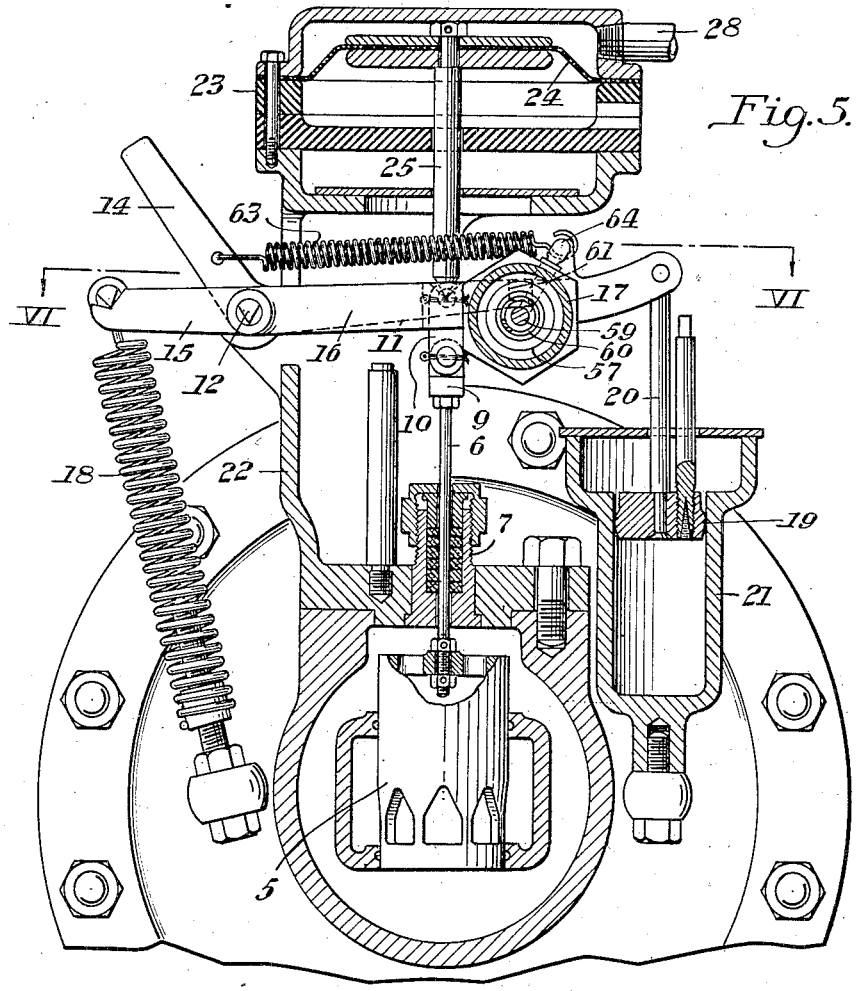
Figure 5 is a vertical sectional view, on an enlarged scale, on the line V—V of Figure 2, looking in the direction of the arrows.

Straddling the lever 11 and the links 10 is a frame 15, including horizontally extending arms 16, one of which carries a relay cylinder 17, which will be hereinafter more fully described. The frame 15 is journaled on the pivotal mounting 12 and is normally urged in a counter-clockwise direction as viewed in Figure 5 by means of a spring 18. For controlling the rapidity of movement of the frame, and preventing chattering thereof, the arms 16 are connected to a piston 19 through the medium of a piston rod 20. The piston is, in turn mounted for movement in a dash-pot 21, the operation of which will be understood by those skilled in the art.

The valve housing 8 is shown as supporting a frame 22 to which the pivotal mounting 12 and the dash-pot 21 are connected. This frame also conveniently carries a diaphragm chamber 23 within which is mounted a diaphragm 24 having secured thereto valve operating rods 25 projecting downwardly therefrom and pointed at their lower ends, as illustrated more particularly in Figure 2, for cooperating with bearing pockets 26 in the arms 16.

As illustrated diagrammatically in Figure 1, the blower housing 27 may have an outlet connection 28 leading into the diaphragm chamber 23 above the diaphragm 24. By means of this connection, the pressure to which the diaphragm is subjected will be proportional to the pressure generated by the blower, so that if the pressure exceeds a predetermined amount the diaphragm will be forced downwardly in opposition to the spring 18 for restricting the steam flow through the valve 5 and thereby slowing the speed of the blower. Such a regulation broadly has heretofore been effected, and the present invention resides more particularly in the provision of means effective in conjunction therewith for obtaining an over-speed control. The results in this respect are obtained in part by the relay cylinder 17 before briefly referred to, and by the relay control illustrated in detail in Figure 7 through the medium of special operating connections which will now be described.

Constituting part of the turbo-blower installation is a sump or reservoir 29 from which a lubricating pump 30 receives its lubricant through a connection 31. Upon proper operation of the pump 30 a supply of lubricant will be delivered thereby through a pipe 32 into a bearing 33 surrounding the shaft 2 adjacent the blower 4. This lubricant, discharged through the bearing under a suitable pressure which, by way of example, may be considered as in the neighborhood of 15 lbs. per square inch, tends to travel in opposite directions along the shaft 2. Its travel in one direction is limited by the slinger rings 34 on the shaft 2. The lubricant, which travels in the opposite direction through the bearing, encounters a thrust collar 36 with which cooperate shoes 37, carried by packing rings 38 which, in turn, bear against liners 39. The pressure under which the lubricant is supplied will be sufficient to cause the same to travel to and across the thrust collar and through the thrust bearing in a direction generally indicated by the arrow A (Figure 2) which direction may be considered as axially or longitudinally of the shaft. The lubricant having passed the thrust bearing and thereby performed its lubricating function is discharged through a suitable opening 40 into the sump 29 for recirculation.

Surrounding the thrust bearing is a lubricant pressure chamber 41 herein illustrated as of comparatively small capacity and connecting with a pressure line 42 which leads into a bellows chamber 43 of the relay control (Figures 1 and 7). This chamber is closed against the escape of lubricant, but contains a suitable metal bellows 44, cooperating at one end with the relay control housing 45 and at the opposite end with a head 46. Secured to the head 46 is a valve-operating rod 47 screwed to a valve 48 in the valve casing 49 of the relay control housing. The valve 48 is normally urged against a seat 50 by a spring 51 bearing at one end against the valve and at the opposite end against a cap 52 removable to permit different springs to be substituted whereby the opposition exerted to opening movement of the valve may be regulated.

Figure 6:
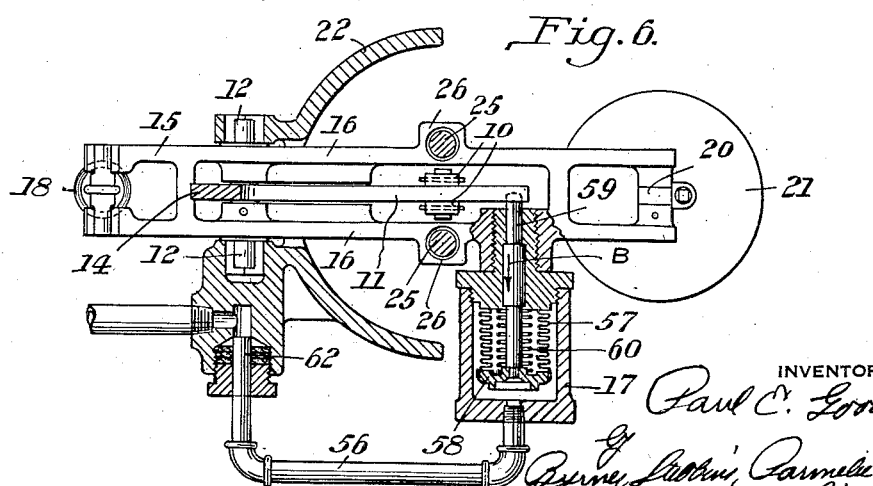
Figure 6 is a detail sectional view, partly in elevation, along the line VI—VI of Figure 5, looking in the direction of the arrows.

A pressure of lubricating fluid is continuously maintained within the valve casing 49 under normal conditions of operation, conveniently by the pipe 32 with a branch connection 53 within which is mounted a flow-controlling orifice 54. The branch connection 53, in turn, communicates with an inlet 55 leading to the casing 49 below the valve 48 and also communicating through a branch 56 with the relay cylinder 17. Within the relay cylinder, as illustrated in Figure 6, is a metal bellows 57 cooperating at one end with the relay cylinder and at the opposite end with a head 58 carrying a locking stem 59. The locking stem is normally urged in the direction indicated by the arrow B by means of a spring 60, movement in this direction being opposed by pressure exerted through the branch connection 56 as supplied through the orifice 54. By reason of this pressure which, as before described, exists during all normal conditions of operation, the spring 60 will normally be held compressed so that the inner end of the locking stem 59 is in holding engagement with the under side of the lever 11, thus locking the lever 11 to the frame 15 and compelling all of the parts of the steam valve control mechanism to move in unison under the control of the diaphragm 24.

Since the relay cylinder is carried by the frame 15 and therefore movable therewith, the branch connection 56 preferably includes a packed joint 62, concentric with the bearing 12 and effective for continuously supplying lubricant under pressure to the relay cylinder while permitting a swinging movement of the frame 15 and the relay cylinder carried thereby.

The foregoing description has been made with reference to the parts under normal conditions of operation. Under abnormal conditions such as would exist with an excessive blowing speed, or with a failure of lubricant supply, it may be desirable to completely cut off the supply of steam to the turbine and thus prevent such an over-speed condition. From the foregoing description it will be apparent that in case of failure of the pump 30 to supply sufficient lubricant, pressure will be released in the relay cylinder 17, thereby permitting the spring 60 to move the locking stem 59 in the direction illustrated by the arrow B and releasing the lever 11. When released, this lever will immediately be swung in a clockwise direction, as viewed in Figure 5, through the medium of a spring 63 connected at one end to the arm 14 and at the opposite end to the frame 15 through the medium of a lug 64. This spring is of such order that upon release of the arm 11 the steam valve will be immediately closed.

It will thus be apparent that in case of failure of lubricant supply, the apparatus will be rendered inoperative until manually reset. The invention contemplates a similar operation in case of a tendency to over-speed, and this operation is obtained by a novel use of the thrust collar and by causing the same to perform a dual function. It has already been pointed out that the lubricant supplied to the bearing 33 through the connection 32 will be effective for lubricating the thrust collar by the general flow of lubricant in a direction axially of the shaft, the resistance to flow through the thrust bearing establishing a differential pressure across the thrust collar. The thrust collar, which is herein illustrated as being formed integrally with the shaft 2, has on its periphery a series of uniformly spaced projections 65 within the casing 41, and between which the oil must pass in lubricating the thrust bearing. This thrust collar, in accordance with the present invention, is utilized to generate an oil pressure in the line 42 and thus in the chamber 43 of the relay control. Under normal conditions of operation, with the speed of rotation of the thrust collar within desired limits, the pressure generated will not be sufficient to overcome the spring 51 and unseat the valve 50. Since, however, as pointed out, the pressure generated by the thrust collar is approximately proportional to the square of the speed, any undesirable increase in speed will be effective for increasing the pressure against the metal bellows 44 and thereby unseating the valve 48.

The unseating of this valve will permit the pressure accumulated therein and in the relay cylinder 17 through the medium of the restricted flow through the orifice 54 to be immediately released, the released lubricant flowing through a connection 66 to the reservoir 29. This release in pressure will be the same in effect as the failure of the pump 30 to supply lubricant, and the relay cylinder will permit the locking stem 59 to be retracted under the influence of the spring 60 and thus release the lever 11 with a resultant closing of the steam valve.

It has been found that the relationship between the square of the speed of the thrust collar and the pressure generated is sufficiently accurate to insure an operation of the character described, it only being necessary to properly choose a valve spring 51 of such order that a predetermined pressure in the chamber 43 will be effective for unseating the valve.

In actual practice, the dragging effect exerted by the thrust collar 36 on the lubricant supplied to the bearing 33 produces an accumulation of pressure in a direction generally radially of the shaft 2 and of the thrust collar itself. When the lubricant reaches the periphery of the thrust collar and encounters the projections 65, there is produced a violent rotation and hence an accumulation of pressure in the chamber 41. This pressure, due to rotation, is generated equally on both sides of the thrust collar, both sides of the thrust collar itself being of identical construction. As the result of this, the pressure differential across the thrust collar produced by the impeller effect of the thrust collar itself is zero, in case there is no oil flow from the casing 41 through the connection 42 in the chamber 43. Since this chamber is closed, there is normally a condition of no flow.

If any appreciable quantity of oil were taken off in a continuous stream through the line 42, the thrust collar would, of course, fail to function through lack of lubrication, so that the operation of the device depends upon its centrifugal action in creating pressure by rotating the oil and upon the fact that it normally delivers no volume of oil for over-speed control purposes. It also depends on the fact that although there is no pressure differential produced across the thrust collar by the impeller action described, there is superimposed on the thrust collar a differential by reason of the pressure at which the lubricant is supplied to the bearing 33 through the connection 32. This insures a condition of operation in which not only is oil continuously fed to the periphery of the thrust collar for maintaining a rotating body of pressure producing oil; but in which the oil is continuously fed to and through the thrust bearing for lubrication purposes.

Only under over-speed conditions when the pressure generated is sufficient to collapse the bellows 44 is there any flow through the connection 42, and this flow is only sufficient to fill the space formed by the collapse of the sylphon. This collapse having been effected, the steam is cut off in the manner described, and the apparatus ceases to function until manually re-set.

It is to be noted that the present invention contemplates an over-speed control as distinguished from a speed regulator, per se, although the over-speed control may be and in the illustrated embodiment of the invention is shown as connected to a part of the speed-regulating system. It is characterized fundamentally by the generation and maintenance of a static pressure proportional to a function of speed and with an absence of flow under normal conditions. This pressure is preferably generated by causing the thrust collar or an equivalent part of the apparatus to serve a dual function. The operation of the thrust collar is also characterized by both a radial pressure effective outwardly and a superimposed pressure differential thereacross for purposes of lubrication, the radial pressure being effective for giving a tripping operation and the longitudinal or axial pressure being useful for purposes of lubrication and for creating a supply of oil effective for pressure generation. By reason of this superimposed pressure, the tripping operation under conditions of overspeed does not interfere with normal lubrication under desired conditions of operation.

It is sometimes desirable to provide for the manual actuation of the metal bellows 44, and to this end the bellows chamber 43 may be provided with a release stem 67 (Figures 1 and 7) by means of which the bellows 44 may be collapsed at the pleasure of the operator. A spring 68 surrounding the stem 67 normally maintains it in inoperative position, as illustrated in Figure 7.

From the foregoing description, it will be understood that the over-speed control herein provided utilizes for control purposes the main valve by means of which the admission of steam is regulated. This is desirable for the reason that the frequent manipulation of the main control valve indicates whether or not such valve is functioning properly, thereby making it possible to impose greater confidence in the successful operation of the over-speed mechanism should such operation become necessary.

It will be apparent from the foregoing that the present invention provides a simple and efficient system and method for discontinuing the operation of a turbo-blower or equivalent apparatus under over-speed conditions, the control being such that it may be readily applied to existing installations without interfering with the normal operation thereof.

While I have herein illustrated and described a preferred embodiment of the present invention, it will be understood that changes in the construction, arrangement and operation of the parts may be made without departing either from the spirit of the invention or the scope of my broader claims.

I claim:

1. The combination with a shaft, of a thrust bearing including a thrust collar, means for superimposing a lubricating pressure differential across said collar, and means responsive to pressure generated by said collar for controlling the rotation of said shaft.

2. The combination with a shaft, of a thrust bearing including a thrust collar, means for superimposing a lubricating pressure differential across said collar, and means responsive to pressure generated by said collar for controlling the rotation of said shaft and stopping rotation of said shaft upon excessive speeds thereof.

3. The combination with a rotating shaft, of a thrust bearing including a thrust collar, means for supplying lubricant to said thrust bearing, and means controlled by said thrust collar through the medium of said lubricant for preventing over-speed of said shaft.

4. The combination with a shaft, of a thrust collar, a lubricant supplied thereto, and a tripping mechanism controlled by said lubricant through the medium of said collar.

5. The combination with a shaft, of means for producing a lubricant flow axially of said shaft, means for producing a pressure flow of said lubricant substantially radially of the shaft, and means responsive to said radial pressure for controlling the shaft speed.

6. The combination with a shaft, of means for producing a lubricant flow axially of said shaft, means for producing a pressure flow of said lubricant substantially radially of the shaft, and means responsive to said radial pressure for controlling the shaft speed and preventing over-speed thereof.

7. The combination with a turbo-blower installation including a turbine and blower having a shaft extending therebetween, of a thrust collar, means for feeding lubricant to said collar, and means responsive to lubricant pressure generated by said thrust collar for controlling the blower speed.

8. The combination with a turbo-blower installation including a turbine and blower having a shaft extending therebetween, of a thrust collar, means for feeding lubricant to said collar, and means responsive to lubricant pressure generated by said thrust collar for controlling the blower speed and preventing over-speed thereof.

9. The combination with a rotating shaft, of a thrust collar effective for creating a shaft speed governing pressure, and means responsive to said pressure for controlling the speed of the shaft.

10. The combination with a blower including a shaft, of rotating means for said shaft, speed regulating means for said rotating means, a thrust collar carried by said shaft and effective for creating a shaft speed governing pressure, and tripping mechanism for said regulating means responsive to said pressure.

11. A speed control for blowers, comprising a blower and a blower shaft, driving means for said shaft, a thrust collar secured to said shaft, and means responsive to the lubricant pressure generated by said thrust collar for rendering said driving means inoperative.

12. The combination with a shaft, of a thrust collar, means for delivering lubricant under pressure to said thrust collar, a pressure chamber cooperating with said thrust collar, a static pressure connection leading from said chamber, and means responsive to the pressure in said static pressure connection for controlling the rotation of said shaft.

13. In the method of controlling shaft speeds, the steps comprising lubricating the shaft, collecting the lubricant under a pressure proportional to the speed of rotation of said shaft, and utilizing such pressure to control the shaft speed.

14. In the method of controlling shaft speed, the steps comprising producing a lubricant flow axially of the shaft, producing a lubricant pressure in a direction radially of the shaft, and controlling the shaft speed by said pressure.

In testimony whereof I have hereunto set my hand.

PAUL E. GOOD.